(12) United States Patent
Gabourie

(10) Patent No.: US 8,191,922 B2
(45) Date of Patent: Jun. 5, 2012

(54) DROP-BED TRAILER

(76) Inventor: Gerald Edward Gabourie, Orillia (CA)

( * ) Notice: Subject to any disclaimer, the term of this patent is extended or adjusted under 35 U.S.C. 154(b) by 0 days.

(21) Appl. No.: 13/024,913

(22) Filed: Feb. 10, 2011

(65) Prior Publication Data

US 2011/0204586 A1 Aug. 25, 2011

(30) Foreign Application Priority Data

Feb. 11, 2010 (CA) .................................. 2692399

(51) Int. Cl.
*B62D 33/10* (2006.01)

(52) U.S. Cl. ......................................... 280/656; 414/482

(58) Field of Classification Search .................... 280/34, 280/42, 638, 639, 40, 43.11, 656, 645; 414/481–486
See application file for complete search history.

(56) References Cited

U.S. PATENT DOCUMENTS

| | | | | |
|---|---|---|---|---|
| 4,008,902 A * | 2/1977 | Dill | ............................ | 280/43.23 |
| 5,584,639 A * | 12/1996 | Walker, Jr. | ..................... | 414/476 |
| 5,727,920 A * | 3/1998 | Hull et al. | ....................... | 414/476 |
| 7,153,080 B2 * | 12/2006 | Schmidt | ......................... | 414/482 |
| 7,559,736 B1 * | 7/2009 | Mohan | ........................... | 414/482 |
| 7,665,952 B2 * | 2/2010 | Schmidt | ......................... | 414/812 |

\* cited by examiner

*Primary Examiner* — John Walters
*Assistant Examiner* — James Triggs

(57) ABSTRACT

An improved drop-bed trailer provides a trailer without ramps that lowers to the ground, enabling one person to load/offload motorcycles, etc. A trailer frame with independently pivotal elongated members on each side of the frame, a wheel on each elongated member. A rubber spring or steel coil spring suspension system on the end of each elongated member. A winch and cable pulley system connected to each end of the elongated members via cable connector fitting through the two snap-in bushings. Cable retrieval upon the winch causes the elongated members to be drawn parallel to the frame in raised locked position. A cable tension device keeps the primary cable uniformly coiled upon the winch while providing slack to the secondary cable for complete compression of the suspension system. A safety restrictor device is mounted to the trailer frame to limit the pivotal movement of the elongated members in the event of a cable mechanism failure.

9 Claims, 18 Drawing Sheets

PIVOT KING PIN SHAFT & BUSHING

PIVOT KING PIN SHAFT & BUSHING

TOWER SIDE FACE ELEVATION
FOR HOLLOW RUBBER SPRING

TOWER SIDE FACE ELEVATION
FOR STEEL COIL SPRING

TOP ELEVATION TRAILER SIDE BRACKET
ON TRAILER FRAME

SIDEVIEW SIDE FRAME PULLEY BRACKET
STOP POST & PLATE TOP

END VIEW SUSPENSION STRUT TOWER

LOWERED    MAXIMUM RAISED    SLACKENED

CABLE TENSION DEVICE KEEPS PRIMARY
CABLE UNIFORMLY COILED UPON THE WINCH
DURING THE SLACKENED TRAILERING POSITION

PLAN ELEVATION

END VIEW SUSPENSION
STRUT TOWER / COIL SPRING

TYPICAL TRAILER FRAME

MAX. POTENTIAL ARC OF THE ELONGATED MEMBER

LOCKED TRAILERING POSITION OF THE ELONGATED MEMBER

RESTRICTED ARC OF AN ELONGATED MEMBER/SAFETY DEVICE

SNAP-IN BUSHING

3500lb EASY LUBE SPINDLE

END ELEVATION TOWER/CONNECTOR

CABLE CONNECTING FITTING
FOR USE WITH STEEL SPRING

LOADING POSITION ON TONGUE STAND

SIDE ELEVATION RAISED TRAILER

SIDE ELEVATION: LOADING/UNLOADING POSITION

DROP-BED TRAILER

CROSS REFERENCE TO RELATED APPLICATIONS

The present application claims foreign priority to Canadian Patent Application CA-2692399, filed Feb. 11, 2010 the entire disclosure of which is incorporated herein by reference.

FIELD OF INVENTION

The present invention relates to the field the drop-bed trailers.

BACKGROUND OF INVENTION

Most load-carrying trailers which are towed behind a vehicle usually have a trailer bed or frame mounted at a fixed height on supporting wheels so as to have sufficient clearance to negotiate the rough ground over which the trailer may be hauled. Trailers of this type can be difficult to load and unload.

In some trailers, commonly called drop-bed trailers, the wheels are mounted for vertical movement relative to the trailer bed so that the bed, or at least the rearward end, thereof, can be raised and lowered at will to facilitate loading and unloading. However, facilitating relative movement of the wheels and trailer frame, while at the same time providing a useful trailer suspension has proven elusive.

One common type of prior art drop-bed trailer employs a robust U-shaped axle, with the wheel being mounted outboard the curled ends, and the frame mounted by leaf springs or the like to the axle. The suspension afforded by this type of trailer is quite adequate, and the trailer is quite robust. However, the bed of this trailer is difficult to raise and lower on uneven ground.

Another common type of prior-art trailer includes independently pivotal, wheel carrying support arms, connected to the trailer frame during towing by a half leaf spring, and each pivotal by a respective cable winch. The half leaf spring of this type provides for a relatively rough ride, as well the dual cable winches make one-person operation of this trailer inconvenient.

Another from of prior-art trailer includes independent wheel carrying elongated members connected to the trailer frame during towing by an assortment of roller guide pins and receivers, adjusting bolts and complicated alignment of the elongated members to the frame. The trailer was operated by a cable pulley system; cable slack is required to allow the suspension system to compress, lack of controlled sufficient amount of cable slack restricted the compression of the suspension system, resulting in damage to the pulley sheaves and cable, causing metal fatigue and failure to the main suspension bolt rendering the trailer, inoperable.

SUMMARY OF THE INVENTION

The present invention comprises an improved drop-bed trailer.

The improved drop-bed trailer is of the type including trailer frame, a pair of laterally-spaced elongated members and wheel for each elongated member. The trailer frame has a lateral axis and a towing positing elevated above the ground for carrying a load. The laterally-spaced elongated members are disposed on opposite sides of the trailer frame and are each pivotally moveable relative thereto about the lateral axis. The wheel for each elongated member is mounted to each elongated member for rotation about a wheel axis parallel to and spaced from lateral axis, such that upon said, pivotal movement of the elongated members, when the trailer is operatively secured to a towing vehicle or supported on a tongue stand, the frame is moveable from the towing position through a range of lowered positions to a loading position, where at least a rearward end of the frame is disposed proximal to the ground.

According to one aspect of the trailer, a discrete rigid support arm can define elongate member and have spaced-apart ends, one of said ends being pivotally mounted to the Frame to permit pivotal movement of the elongated member about the lateral axis.

Additionally, the wheel for said elongate member can be mounted at an intermediate position on each elongated member between spaced-apart ends.

As well, a suspension member can be provided for each support arm, each suspension member selectively operatively connecting the elongated end of the elongated member for which it is provided to the frame in a manner in which biases said support arm for movement, from positions corresponding to said lowered positions, to a respective towing position which corresponds to the towing position of the frame.

As well, a compressible rubber spring or steel coil spring can be provided for each elongated member; guide mechanism can be provided for each elongated member and which, a primary cable, a cable tension device, a pulley block and a secondary cable is provided.

The compressible rubber spring or steel coil spring is provided for each elongated member selectively operatively connects the end of said member for movement, from positions corresponding to said lowered positions of the frame.

The guide mechanism for each elongated member selectively constrains the movement of the end of each elongated member in substantial alignment with a plane oriented normal to the lateral axis and along an arc defined by the lateral axis which ensures contact of the suspension member with the elongated member and the frame while towing. The winch is in receipt of the primary cable, the primary is connected to the pulley block, the secondary cable passes through the pulley block and has ends coupled, respectively, to the ends of the elongated member, such that, as the primary cable is coiled upon the winch, the secondary cable draws the elongated members towards respective towing positions, corresponding to the towing position of the frame, independently of one another, and such that, as the primary cable is released from the winch, the secondary cable is played out, to allow the elongated members to move towards their respective lowered positions.

BRIEF DESCRIPTIONS OF DRAWINGS

Figure 7:
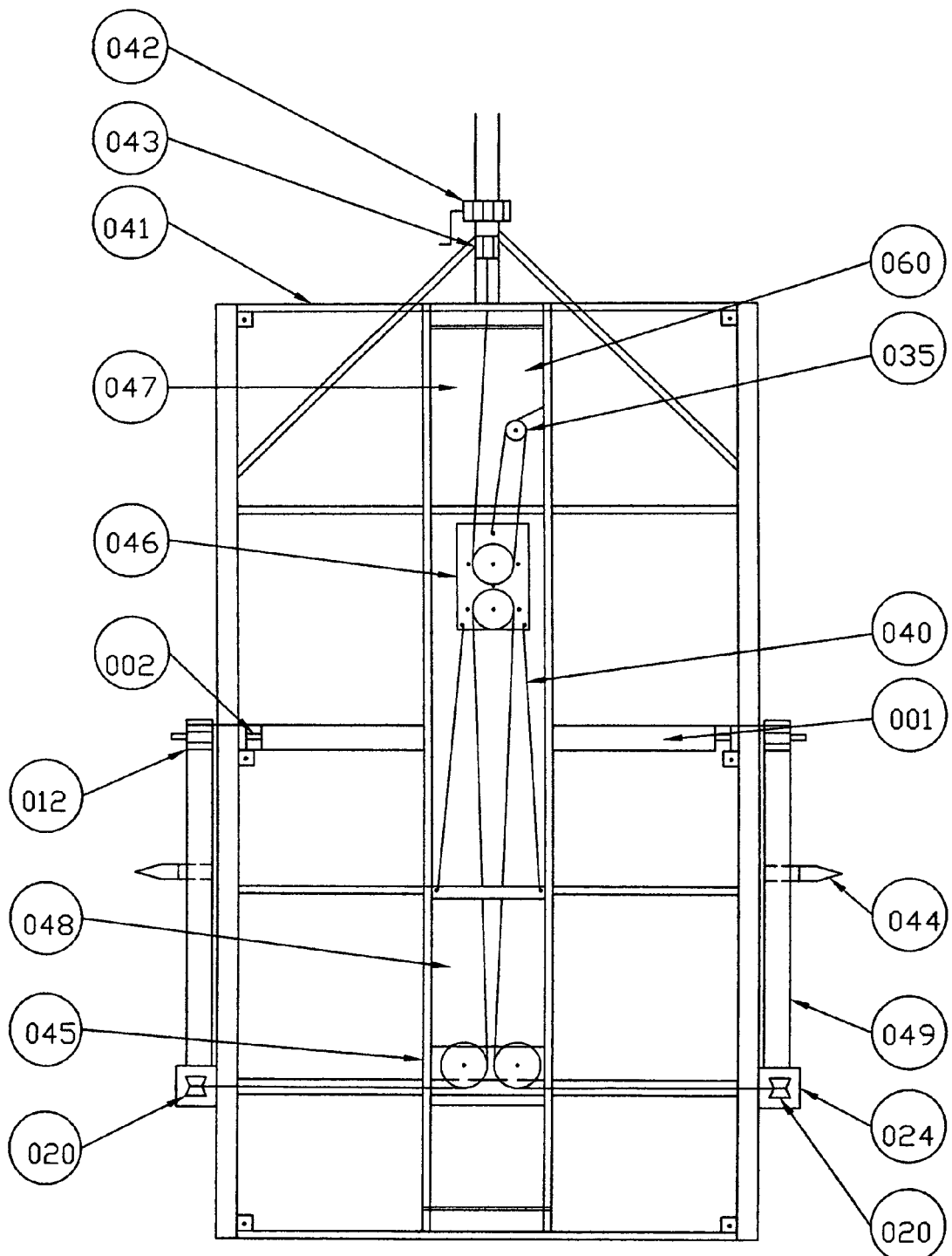
FIG. 007 is a typical trailer frame.

An exemplary embodiment of the drop-bed trailer is illustrated and is designated by the general reference #100 in FIG. 007.

Figure 13:
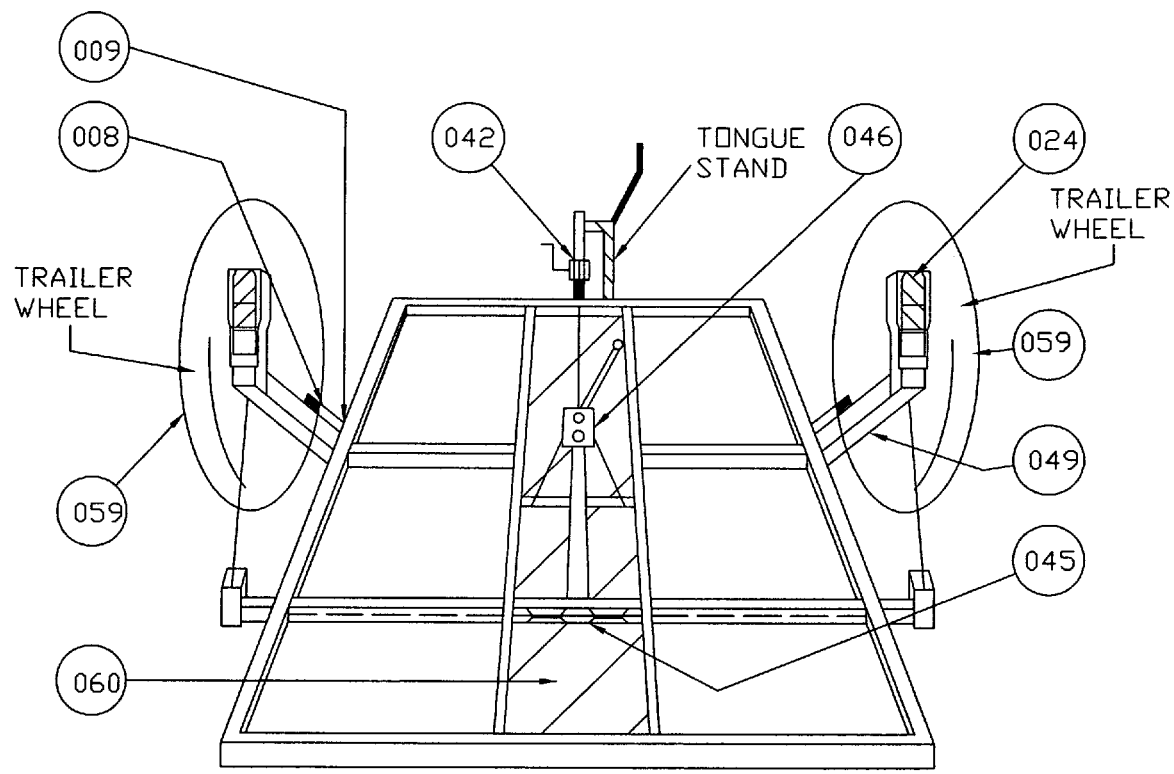
FIG. 013 is an end view of a typical frame on tongue stand or tow vehicle in the loading position.
Figure 14:
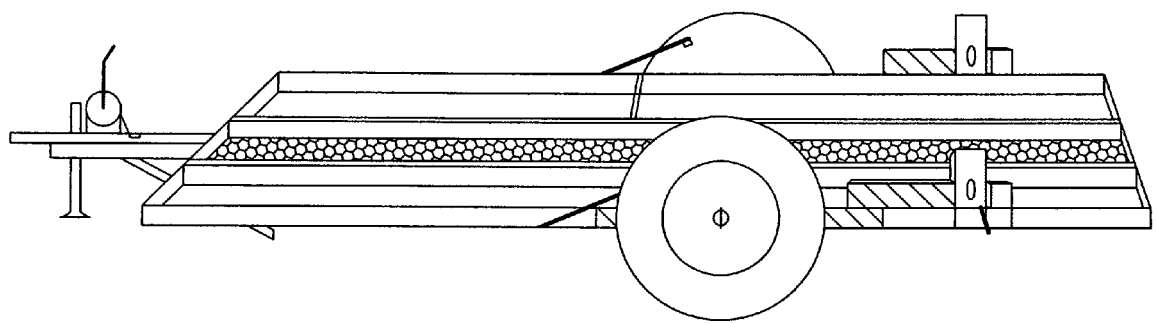
FIG. 014 is a side view of typical trailer frame in the raised position.
Figure 15:
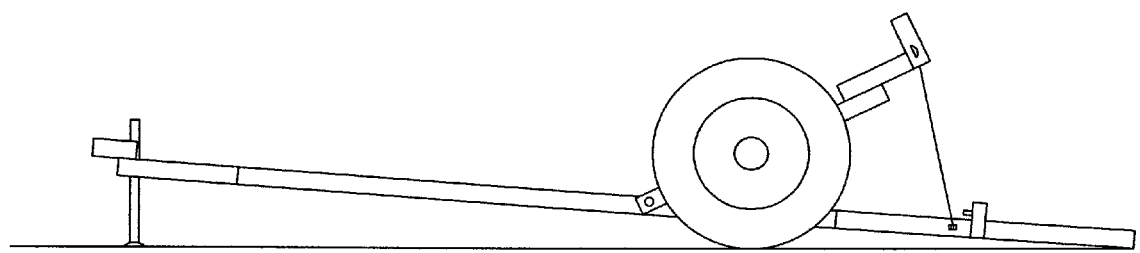
FIG. 015 is a side view of typical trailer frame in the lowered position.

As will be readily understood by persons of ordinary skill in the art upon reference FIG. 013, FIG. 014, FIG. 015, the drop-bed trailer #100 includes a trailer frame #041 having lateral axis y-y and a towing position elevated above the ground (as shown in FIG. 014), and pivot ably moveable about the lateral axis y-y; and a wheel #59 for each elongated member #049. The wheel #059 is mounted on each elongated member for rotation about a wheel axis w-w parallel to and spaced from the lateral axis y-y, such that upon said pivotal movement of the elongated member #049 when the trailer #100 is operatively secured to a towing vehicle or supported on a tongue stand. The frame #100 is moveable from the towing position through a range of lowered positions to a loading position where at the end of the frame #100 is disposed proximal to the ground as shown in FIG. 015.

Figure 1:
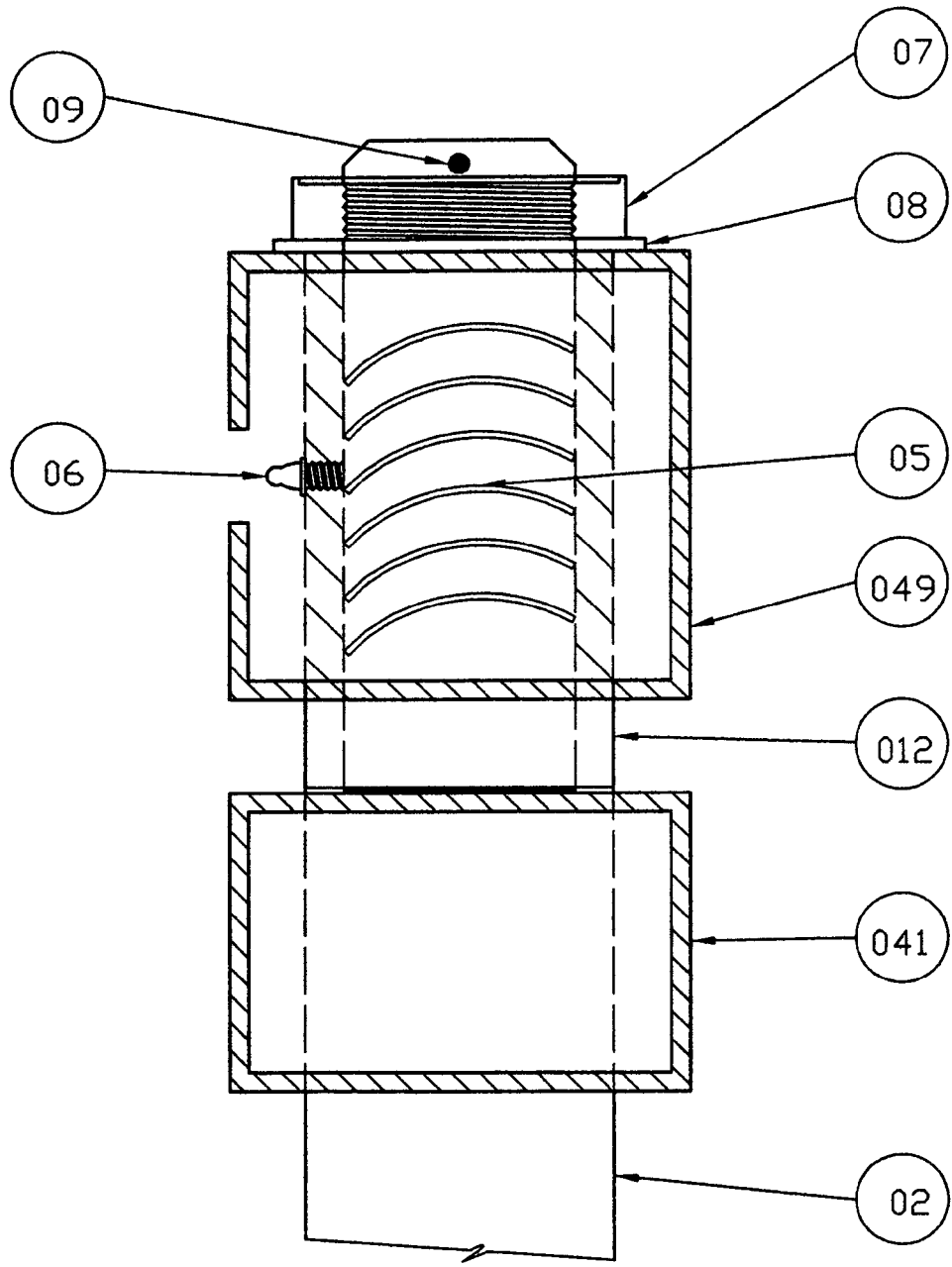
FIG. 001 is a cross section view of a pivot king pin shaft and bushing through elongated member, and trailer side frame.

In terms of detailed construction and operation reference is made to FIG. 007 wherein will be seen discrete rigid elongated member #049 takes the form of a 3"×3" square steel tube, each elongated member #049 has spaced apart ends, the elongated end mounted to the frame #100 at the lateral axis y-y through bushing #012 to king pin axel #022, the manner of which the elongated member is mounted is illustrated in FIG. 001 specifically a 2" O.D ¼" wall spiral grooved greased bushing extends laterally through a corresponding bore defined in the sides of the 3" tubing #049 and is welded in place through the open end of the elongated member, then steel caped, the boss end of the bushing #012 protrudes ⅝" to form a boss and space swing arm #049 parallel to the side trailer rail #041 the bushing #012 provided with interior spiral grease grooves #005 and a zerk grease fitting #006 which extends to a corresponding hole in the bottom of the pivot end of the elongated member the king pin stub axel FIG. 041 is welded laterally through the side frame #041 to proved mounting of the elongated member #049 and bushing #012 the king pin stub axel extends inward to the centre frame of the trailer, the king pin extends laterally through the side rail #041 provides an 1½" diameter axel on which to mounted to the elongated member #049 through bushing #012, the protruding end is threaded to accept a 1" I.D nylock nut and a safety cotter pin to retain an elongated member #049 to the trailer frame, the boss of the bushing #012 riding against the machine face of the king pin axel, along with grease this minimizes the frictional contact to provide a smooth pivotal movement of the elongated member #049 to the side rail trailer frame #041.

With regard to the wheel #059 is mounted on each elongated member at an intermediate position. Each wheel can be mounted to a stub axle fitted through corresponding bore formed through the elongated member #049 and welded in place.

Figure 2:
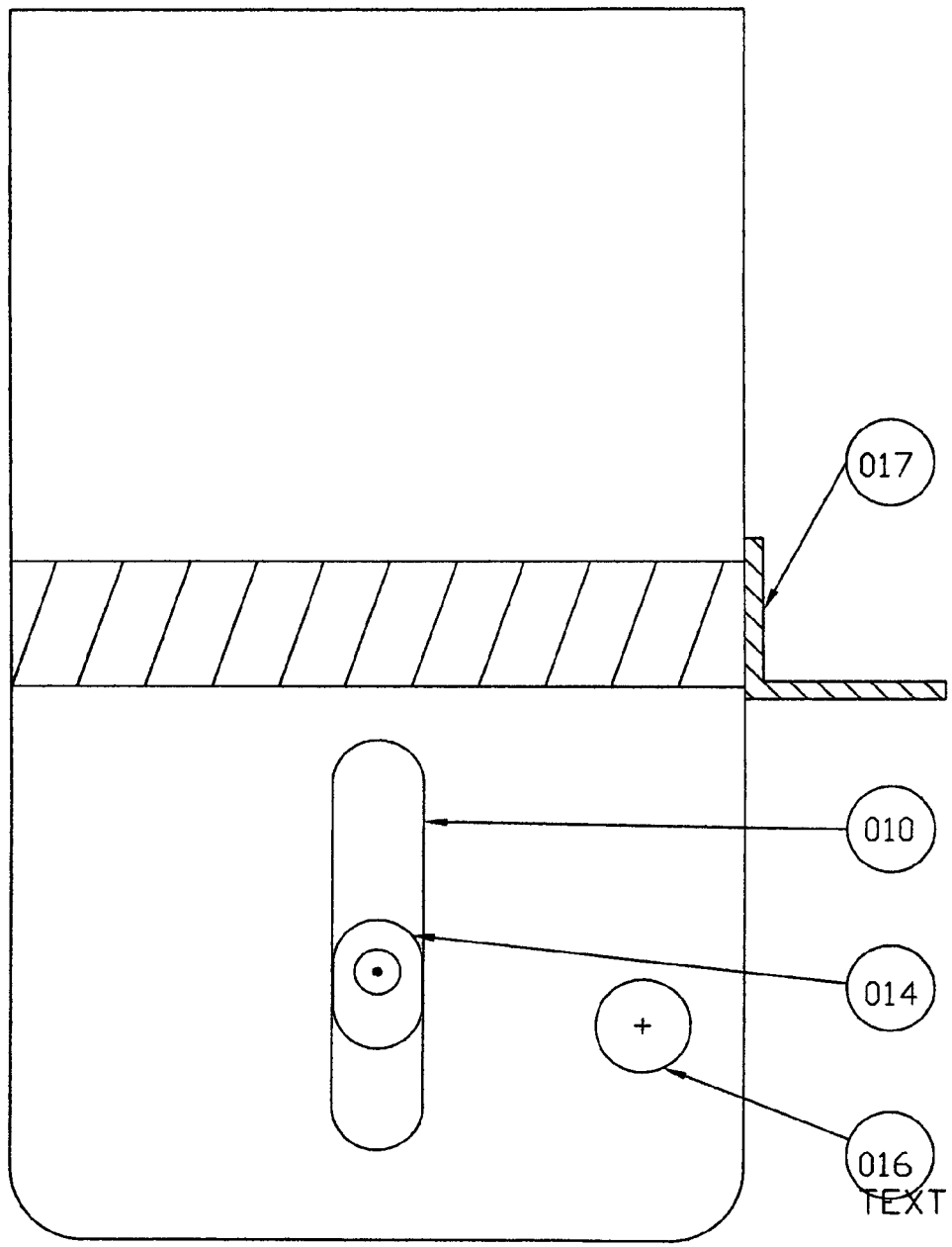
FIG. 002 is a suspension tower side face elevation for use with a hollow rubber spring, showing a slot #010, a slide guide #014, a hole for the hold down pin #016, the hack tower stop plate #017.
Figure 2A:
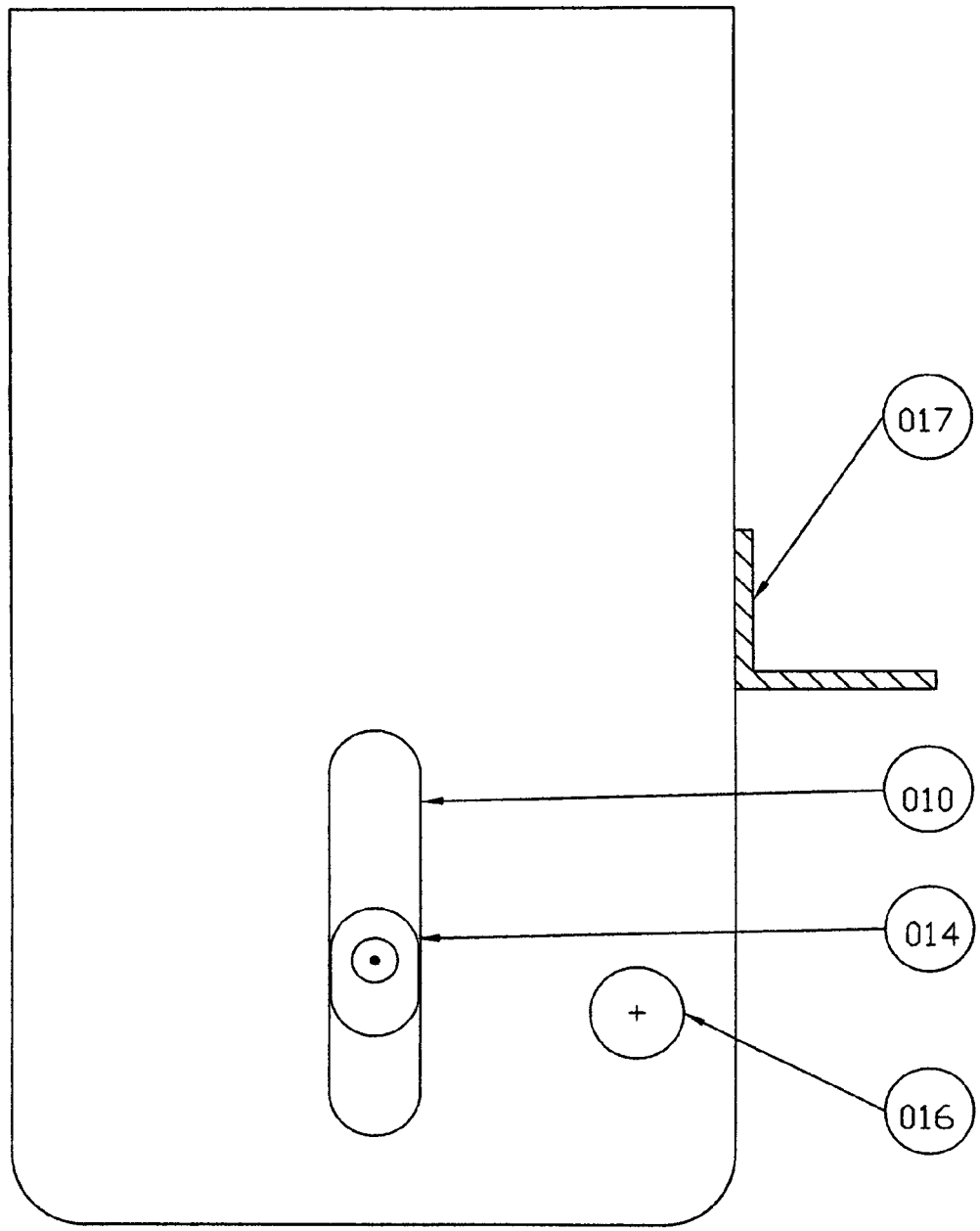
FIG. 002a is a suspension tower side elevation with straight sides for use with a coiled steel spring.
Figure 4:
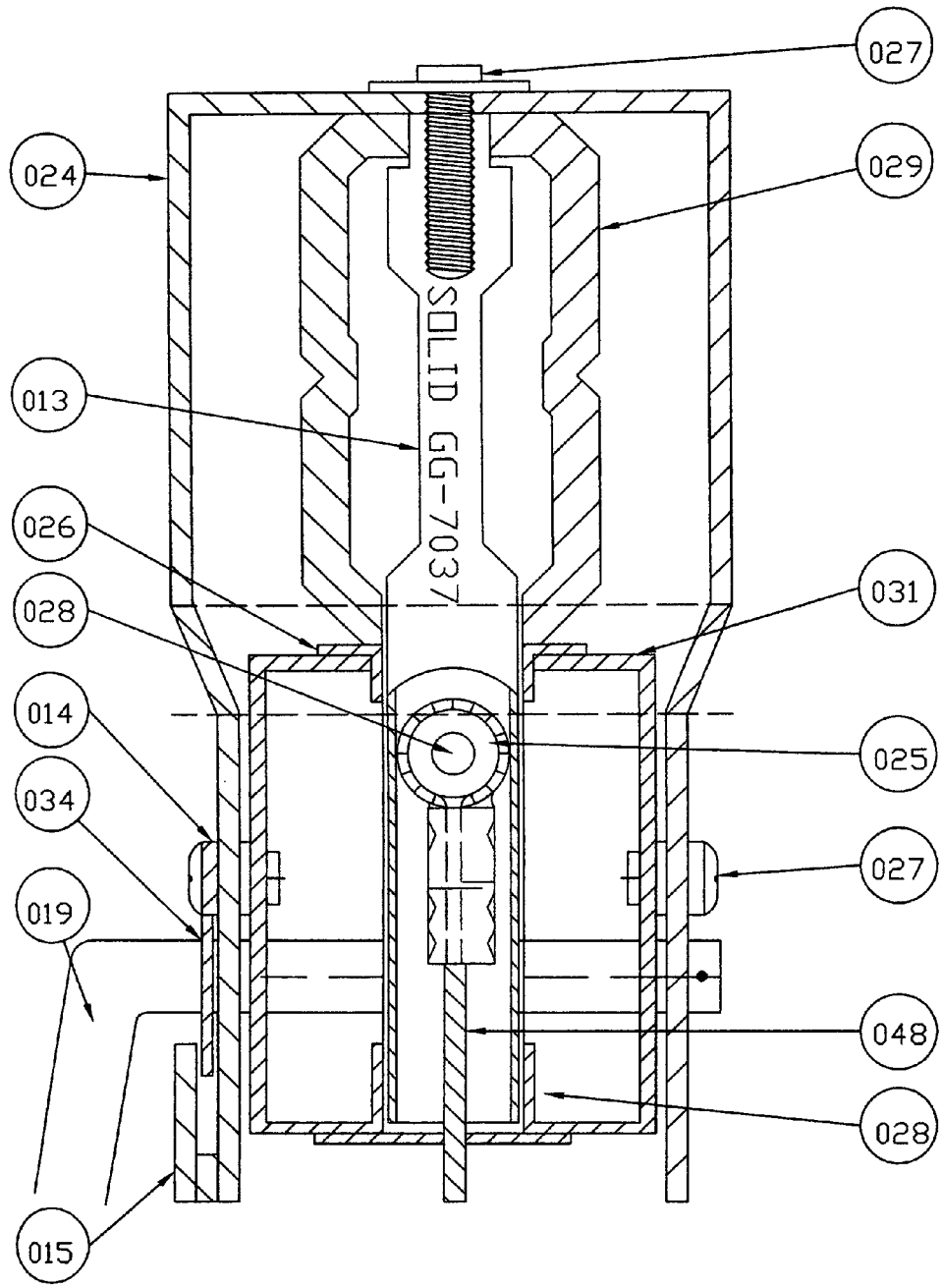
FIG. 004 is an end view of a suspension tower #024, rubber spring #029, elongated end #031, slide guide #014, with fastening bolt, and a tapered cable connector part 3G67037 reference #013, lock in pin #034.
Figure 6:
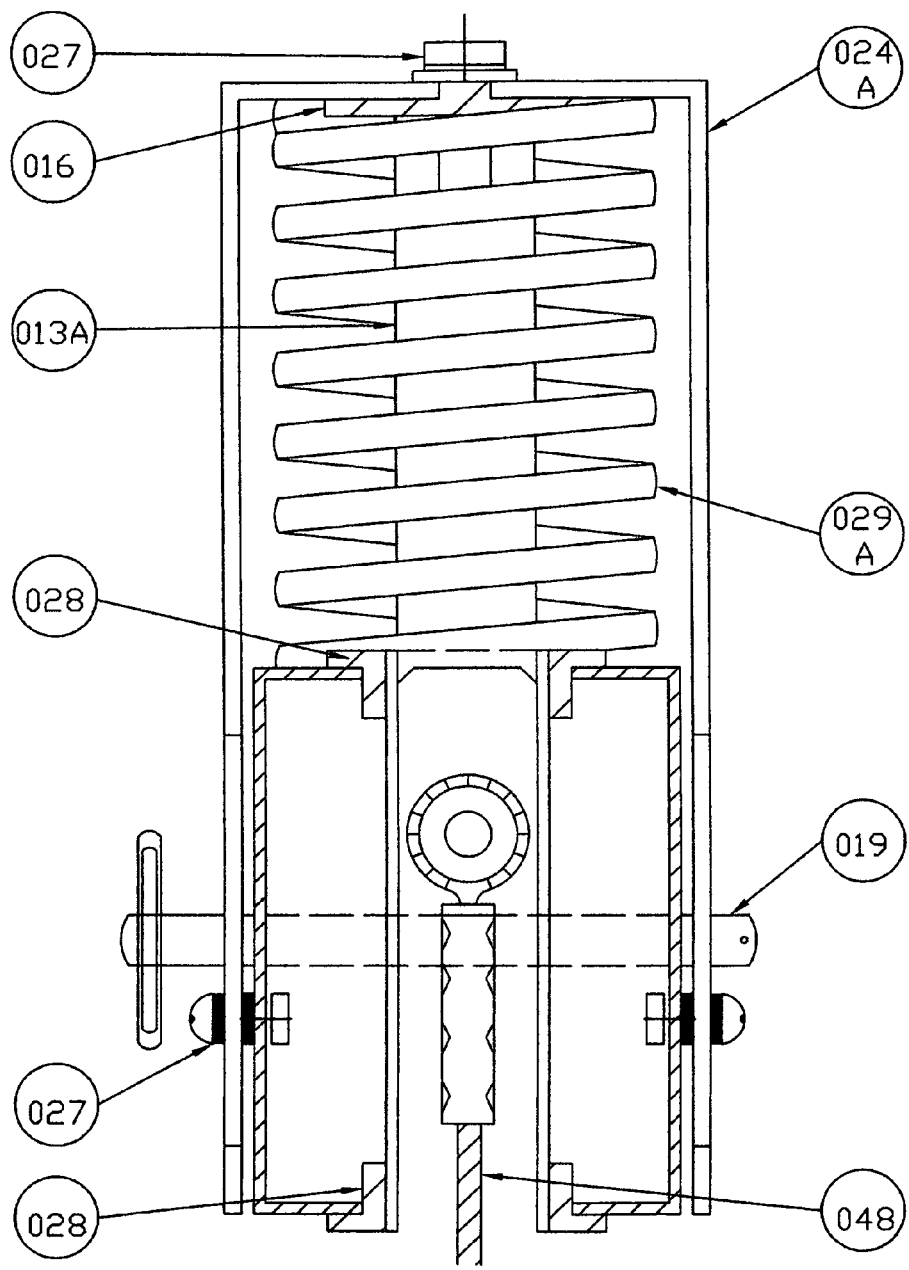
FIG. 006 is an end view of suspension strut tower #024a in use with a steel coil spring #029a, top retainer washer #016, connecting bolt #027, lock in pin #019, secondary cable #048.

As best seen in FIG. 002, FIG. 004, and FIG. 006 a suspension tower #024 is provided on the elongated end of each elongated member #049 and is reasonably mounted to the elongated member #049 by a slide guide #014 mounted through the slots #010 provided in the sides of the tower #024 and the upper elongated and #031 of the elongated member #049. The suspension tower #024 straddles the upper elongated end of the elongated member #049, sandwiched over a hollow rubber spring #029 or steel spring #029a. A ⅜ths #8-24 fine thread #033 bolt secures the cable connector fitting #13 part #G7037/GG7037a through a hollow rubber spring #029 or a steel coiled spring #029a. The cable connector #013 passes through the two snap-in bushings #028 mounted through corresponding holes vertically in the elongated end of the elongated member.

A type of suspension is provided in the form of a compressible hollow rubber spring #029 or steel coil spring #029a provided for each elongated member secured through the suspension tower #24 by a bolt #033 to strut style cable connector fitting #013 as best seen in FIG. 004 and FIG. 006 the spring is shown in a vertical cross section for clarity. When the suspension tower assembly is secured to the side rail frame #041 via locking pin #019 through the frame hold down post #022 and pin #018 the cable is then relieved to provide slack to the suspension within the tower #024 locked in place. The elongated end #031 of the elongated member #049 is allowed to move in a vertical arch as the hollow rubber spring #029 or steel coil spring #029a compresses under travelling loaded conditions.

The combination of the slide guides #014 and the strut cable connector fitting #013 travelling through the vertical snap-in bushings #028 provides a smooth action suspension. The secondary cable #048 connected to the strut cable connector fitting #013 through side pulley block #020 completes the connection of the elongated end #031 of the elongated member to the side rail trailer frame #041 as persons or ordinary skill in the art will readily understand the suspension of this trailer #100 can be routinely modified for heavier or lighter loads simply by substituting heavier or lighter duty commercially available rubber springs or steel coiled springs.

To assist in lowering a trailer frame #100 a winch assembly #042 is provided with reference to FIG. 007. The winch assembly includes a winch #042, primary cable #047, master pulley block #046, dead end pulley block #035, secondary cable #048, tension retrieval straps #040, and a tongue guide pulley block #043. The winch #042 is mounted on the tongue and is in receipt of the primary cable #047 from the winch #042, the primary cable #047 passes through the tongue pulley block #043 and the frame #041 through the closed centre pan #060 to the master pulley block #46, back through the dead end pulley #035 and returning to the fixed mount on front of the master pulley block.

Figure 3:
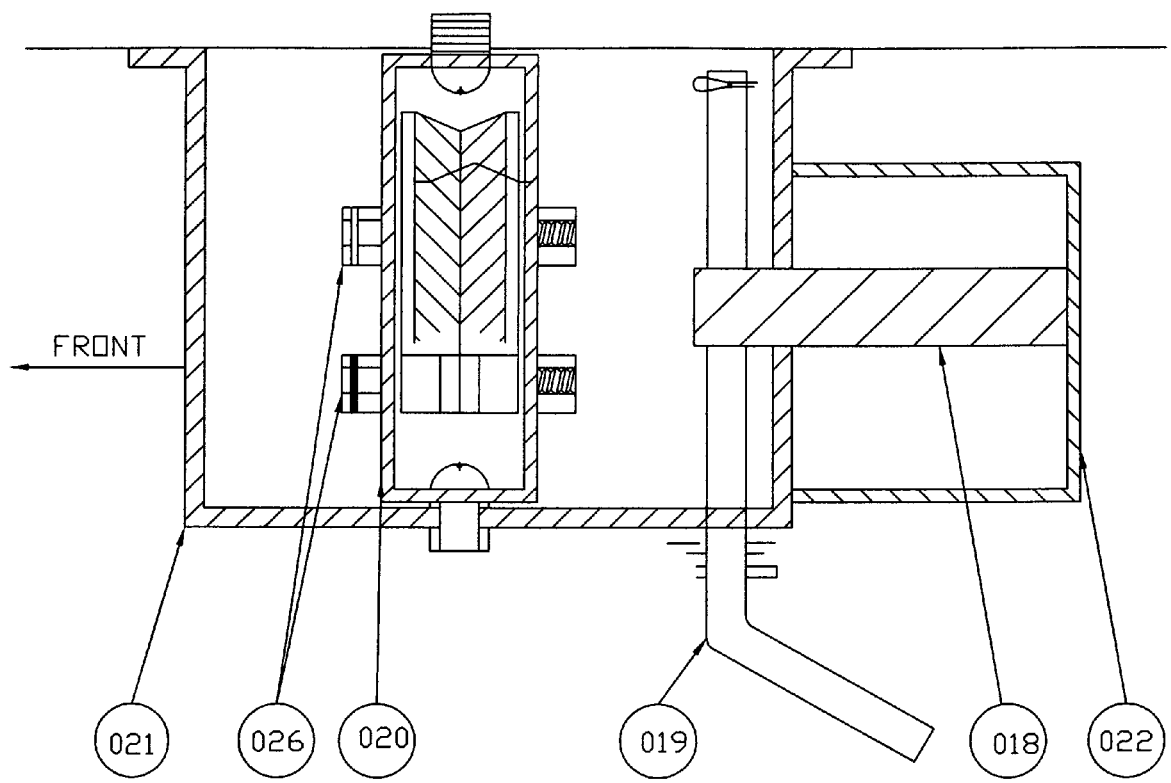
FIG. 003 is a top elevation of a trailer side bracket #021, fixed pulley block #020, lock in pin #019, vertical stop post #022, hold down pin #018.
Figure 3A:
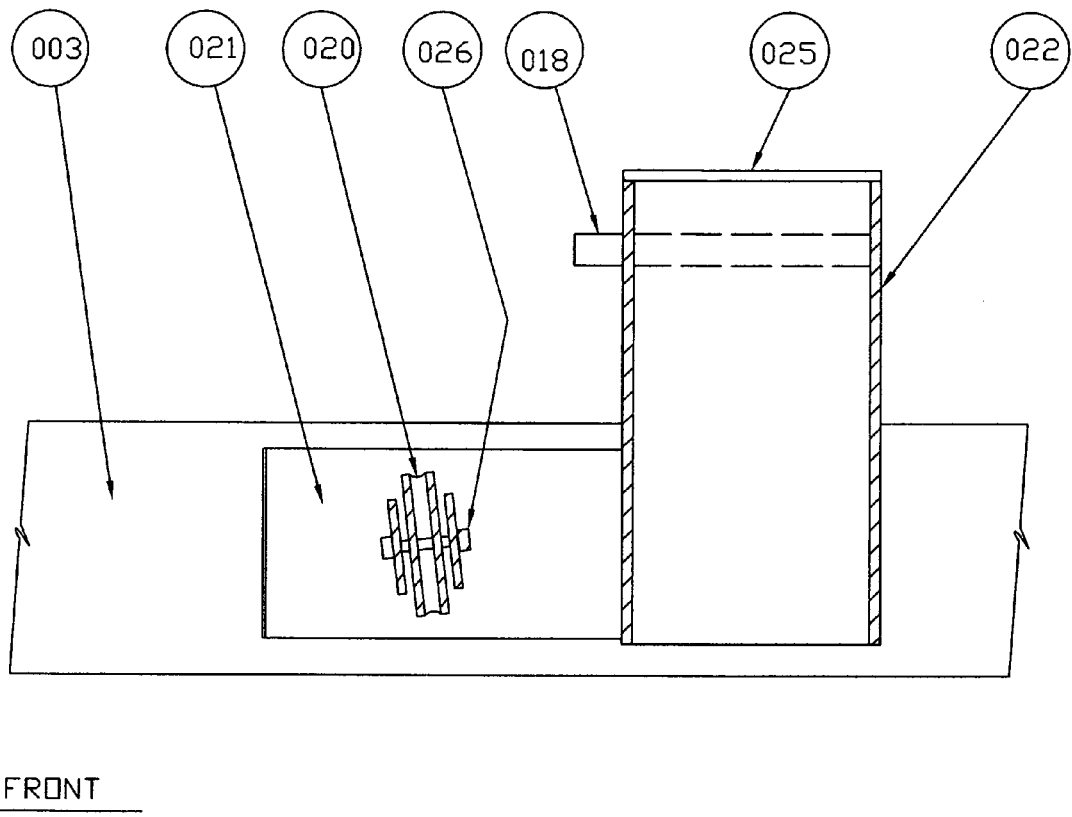
FIG. 003a is a side view of the side pulley bracket #021, a fixed pulley bracket #020, the vertical stop post #022, the stop plate #023, the hold down pin #018.

This completes a block and tackle arrangement of the primary cable #047 the secondary cable #048 is connected to the cable connecting tube fining #013 as seen in FIG. 004 and FIG. 006. The cable travels over the fixed #020 as seen in FIG. 003a through the frame and the cross over pulley block #045 up the centre of the enclosure around the hack pulley sheave of the master pulley block #046 returning to the cross over pulley sheave #045 through the frame to the opposite side rail pulley, to the cable connector fitting #013 and opposite elongated member. This completes the connection to the winch #042.

As the primary cable #047 is coiled upon the winch #042 the elongated member #049 are caused to pivot towards the towing positions throughout the pivotal movement of the elongated member #049 the suspension tower #024, springs #029, etc. are carried out by the elongated ends #031 of the elongated members #049 and held in place by the secondary cable #048. When the elongated member #049 reaches the towing position parallel to the trailer frame, the lock in pin #019 can be inserted through hole #016 of the tower #024, below the hold down pin #018 in hold down post #022 through the opposite hole in the tower #024 thus locking the tower and the entire assembly to the side rail trailer frame #041, FIG. 002 and FIG. 003a, this improvement is required for an effective and functional operation of alignment for hold down purposes.

Figure 5:
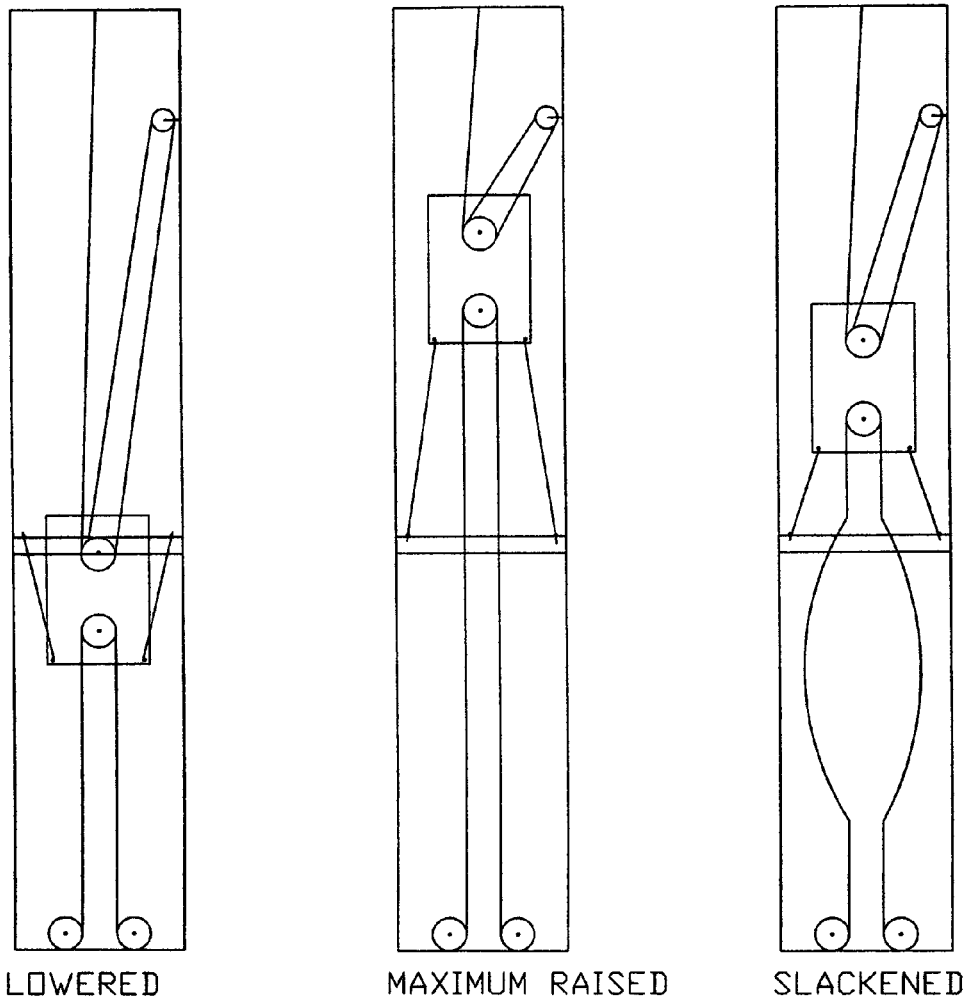
FIG. 005 is a cable tension device of heavy duty rubber or steel spring installed to maintain uniform tension upon the primary cable of the winch providing slack to the secondary cable during trailering.

A cable tension device as illustrated in FIG. 005. Raising and lowering the trailer to prepare for towing requires the primary cable #047 to be tightly coiled upon the winch #042. This in turn tightens the secondary cable #048 to pull the elongated member #049 in an alignment parallel to the trailer frame in a raised position. The lock in pin #019 is inserted through the suspension tower #024 and under the hold down assembly #022 and pin #018 as seen on FIG. 003a. After inserting the lock in pin #019 the primary cable #047 must be released to provide sufficient slack to the secondary cable #048 and thus to the rubber spring #029 or steel coil spring #029a. This cable slack must be provided to allow full compression of the hollow rubber spring #029 or steel coil spring #029a.

Figure 8:
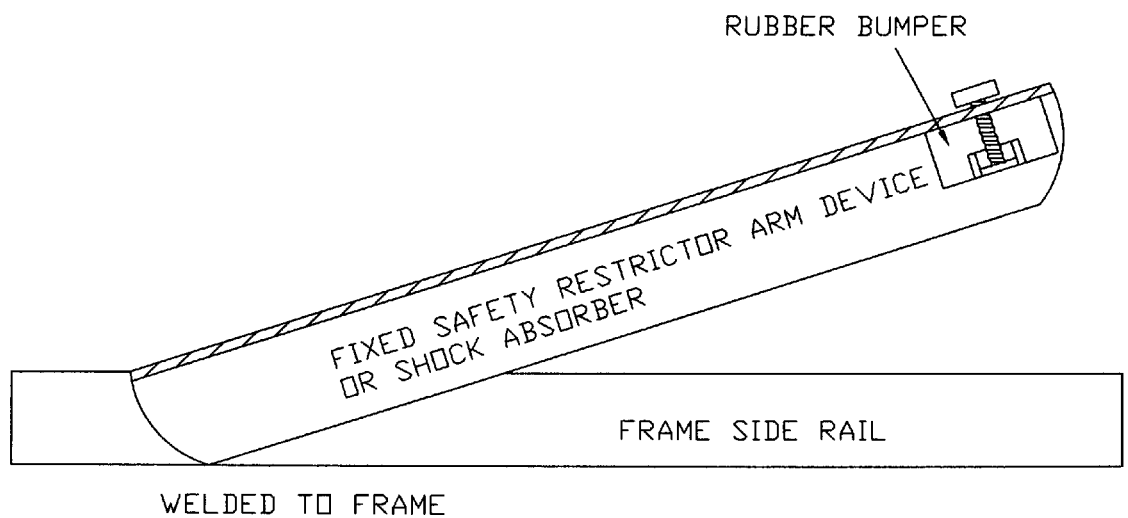
FIG. 008 is a side view of an elongated member, a restrictor safety device welded or bolted to the side frame.
Figure 9:
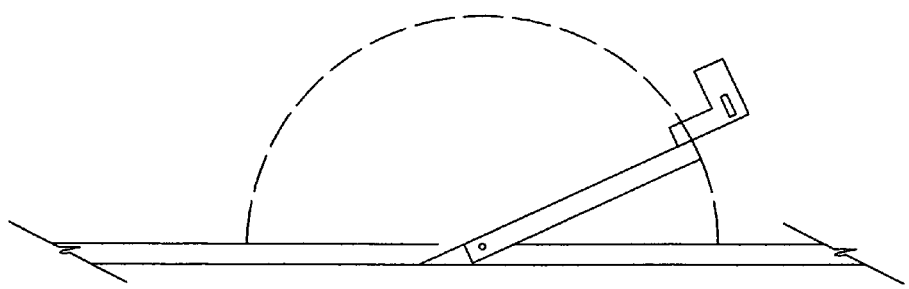
FIG. 009 is a side view of an elongated member restrictor safety device in use.
Figure 9:
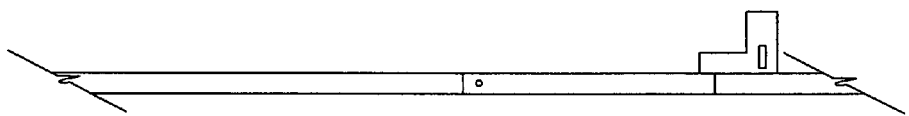
Figure 9:
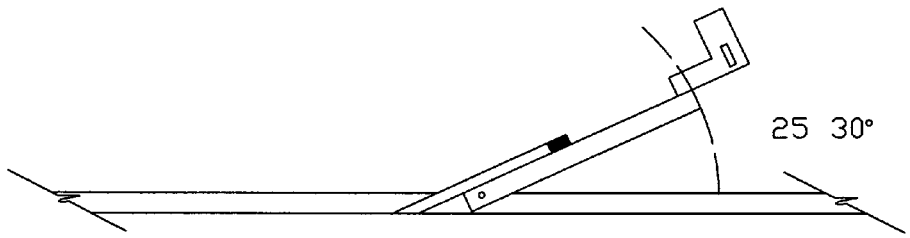
Figure 10:
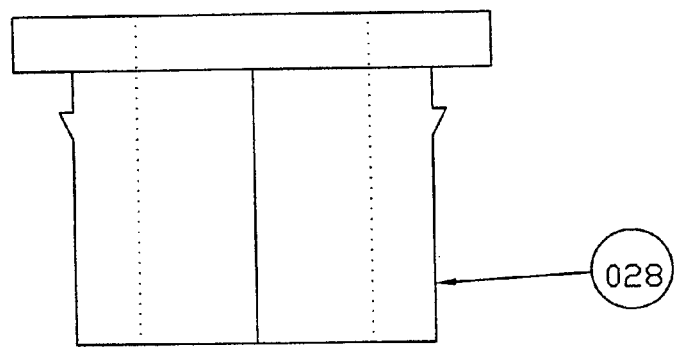
FIG. 010 is a snap-in bushing #028.
Figure 11:
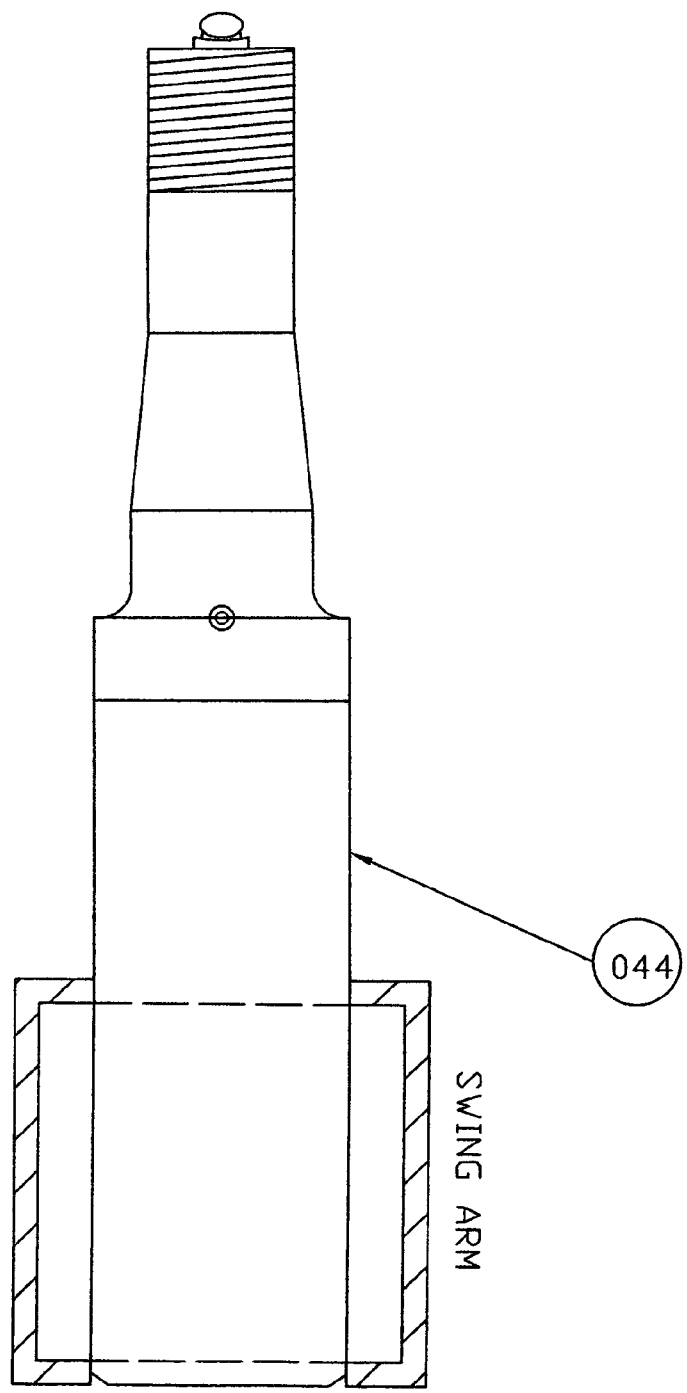
FIG. 011 is a typical easy lube #3500 wheel spindle.
Figure 12:
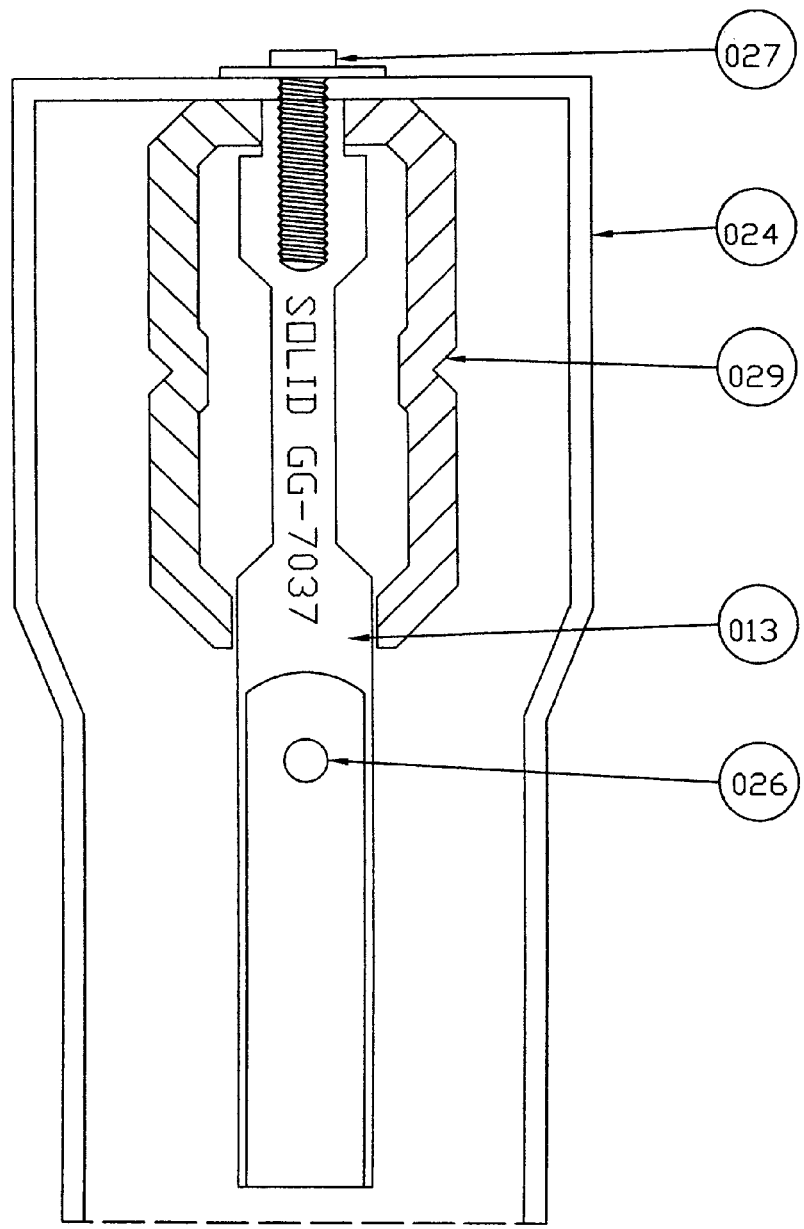
FIG. 012 is a tapered cable connector #GG7037 for rubber spring.
Figure 12A:
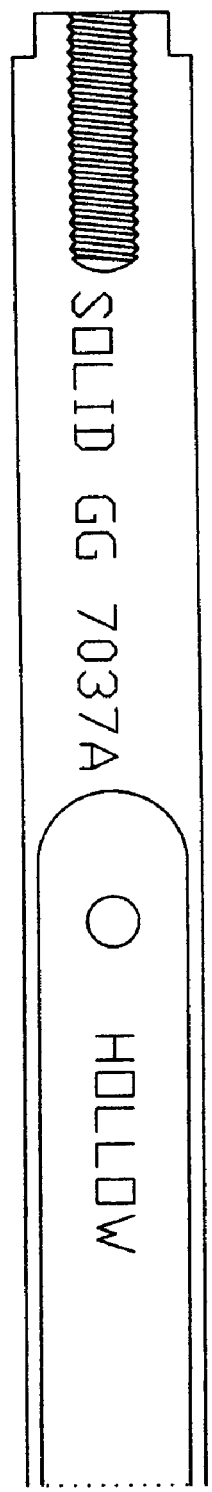
FIG. 012a is a straight cable connector #GG7037a for steel coil spring.

A fixed restrictor device for a elongated member of a drop-bed trailer is illustrated in FIG. 008 and FIG. 009. During this operation of raising a trailer bed parallel to the elongated member, the cable is pulled under high tension to align the suspension for lock down. The restrictor safety device restrains the elongated member #049 to a limit of 25-30 degrees of its potential 180 degree arc, thus allowing for sufficient movement to lower the trailer to the ground for loading purposes.

Of interest, the cable arrangements and methods by which the elongated member #049 is mounted to the trailer frame make it relatively easy for this trailer to be disassembled and compactly packaged for transportation. By removing ⅝ bolt and nylock nut #026 from the secondary cable #048 as seen in FIG. 004 and FIG. 006 the cable is easily removed from the cable connector tube fitting #013, the cotter pin #009 and nylock and nut #007 from the king pin axel allows the elongated member #049 and the assembly to be easily removed for shipment.

Finally, it is to be understood the improvements herein and shown are necessary to provide the safety of persons in the operating vicinity of the trailer. The integrity of the inventions prescribed functions, the utility, the economy of manufacture, and the limited manufacture's liability. The invention is limited by claims appended hereto.

The invention claimed is:

1. An improved drop-bed trailer comprising:

A trailer frame having a lateral axis and towing position elevated above the ground for carrying a load;

A pair of laterally-spaced elongated members disposed on opposite sides of the trailer frame and pivotally moveable relative to the frame about the lateral axis, each elongated member having spaced-apart ends, one of said ends being pivotally mounted to the frame to permit pivotal movement of said elongated member about the lateral axis;

A wheel mounted at an intermediate location on each elongated member between said spaced-apart ends for rotation about a wheel axis parallel to and spaced from the lateral axis, such that, upon said pivotal movement of the elongated members, the trailer raises or lowers when the trailer is operatively secured to a towing vehicle or supported on a tongue stand;

Actuation means for urging the ends of the elongated member from respective loading positions thereof corresponding to the loading position of a trailer to a towing position via a winch, a primary cable, a master pulley block and a secondary cable;

The actuation means comprises the winch and the primary cable, coupled to the winch such that in use, the primary cable is coiled upon the winch and connected through a front sheave of the master pulley block, the secondary cables connect through a back pulley sheave of the master pulley block and connected to each end of the elongated member via a cable connector fitting which passes through a suspension member to a suspension tower, as the primary cable is coiled upon the winch the secondary cable draws the ends of each elongated member to the towing position corresponding to the towing position of the frame of the trailer and as the primary cable is uncoiled from the winch, the primary and secondary cable is played out to allow the ends of the elongated member to move to the loading position of the trailer;

A cable tension device is connected to the backend of the master pulley block and the rear position of the trailer, maintains a uniform coiling and uncoiling of the primary cable upon the winch, thus during the uncoiling operation of the primary cable slack is provided to the secondary cable as required for compression of the suspension member.

2. An improved drop-bed trailer according to claim #1 wherein an elongated members restrictor device has a rubber bumper or shock absorber welded or bolted to the side frame of the trailer such that if a failure occurred of the cable mechanism, the rotating arc of the elongated members would be restricted to 25-30 degrees of their 180 degree potential arc.

3. An improved drop-bed trailer according to claim #1 where in the primary cable is connected to the secondary cable by way of the master pulley block.

4. An improved drop-bed trailer according to claim #1 wherein the cable tension device consists of one or more heavy duty rubber straps or steel coil spring connected to the master pulley block and fastened to the rear portion of the trailer as to maintain the primary cable tight upon the winch while providing slack to the secondary cable, thus allowing for full compression of the suspension system during the trailering position.

5. An improved drop-bed trailer according to claim #1 wherein the secondary cable is connected to each end of the elongated members by the cable connector fitting.

6. An improved drop-bed trailer according to claim #5 wherein the cable connector fitting passes through two snap-in bushings in the end of the elongated member through the suspension member and fastened to the suspension tower completing the connection of the secondary cable to the trailers mechanism.

7. An improved drop-bed trailer according to claim #6 wherein the suspension member is a hollow rubber spring or a steel coiled spring saddled by the suspension tower with elongated slots secured to the elongated ends of each elongated member.

8. An improved drop-bed trailer according to claim #7 wherein the suspension tower is secured through the elongated slots to the elongated members by the slide guide mechanism.

9. An improved drop-bed trailer according to claim #8 wherein the slide guide mechanism assists in the control of the suspension tower's performance along with the two snap-in bushings and the cable connector fitting.

* * * * *